United States Patent [19]
Ward et al.

[11] Patent Number: 5,160,464
[45] Date of Patent: Nov. 3, 1992

[54] POLYMER IRRADIATION

[75] Inventors: Ian M. Ward; Denis W. Woods, both of Leeds, England; Walter K. Busfield, Sunnybank Hills, Australia

[73] Assignee: National Research Development Corporation, London, England

[21] Appl. No.: 180,707

[22] Filed: Mar. 8, 1988

Related U.S. Application Data

[63] Continuation of Ser. No. 680,519, Dec. 10, 1984, abandoned.

[30] Foreign Application Priority Data

Dec. 9, 1983 [GB] United Kingdom ................. 8332952

[51] Int. Cl.$^5$ ..................... B29C 35/10; B29C 47/00; B29C 55/00; B29C 71/04
[52] U.S. Cl. .................... 264/22; 264/210.4; 264/210.8; 522/120; 522/121; 522/125; 522/127; 522/161; 526/348.1
[58] Field of Search ............... 522/125, 127, 120, 121, 522/161; 264/22

[56] References Cited

U.S. PATENT DOCUMENTS

| | | | |
|---|---|---|---|
| 3,188,165 | 6/1965 | Magat | 522/125 |
| 3,286,322 | 11/1966 | Sneary | 522/125 |
| 3,414,498 | 12/1968 | Shinohara | 522/125 |
| 3,816,284 | 6/1974 | Kagiya | 522/124 |
| 3,886,056 | 5/1975 | Kitamaru | 204/159.2 |
| 3,962,205 | 6/1976 | Ward | 528/502 |
| 4,225,403 | 9/1980 | Arbit | 204/159.14 |
| 4,228,118 | 10/1980 | Wu | 264/210.8 |
| 4,230,752 | 10/1980 | Benedyk | 428/17 |
| 4,254,072 | 3/1981 | Capaccio | 528/502 |
| 4,525,564 | 6/1985 | Capaccio | 526/348.1 |
| 4,551,296 | 11/1985 | Kavesh et al. | 264/204 |
| 4,668,577 | 5/1987 | Ohta et al. | 264/22 |

FOREIGN PATENT DOCUMENTS

| | | |
|---|---|---|
| 0020958 | 1/1981 | European Pat. Off. . |
| 0022184 | 1/1981 | European Pat. Off. . |
| 0047171 | 3/1982 | European Pat. Off. . |
| 0047625 | 3/1982 | European Pat. Off. . |
| 48-19635 | 6/1973 | Japan . |
| 49-110736 | 10/1974 | Japan . |
| WO84/01156 | 3/1984 | PCT Int'l Appl. . |
| 784037 | 10/1957 | United Kingdom . |
| 853737 | 11/1960 | United Kingdom . |
| 1568964 | 6/1980 | United Kingdom . |
| 1588818 | 4/1981 | United Kingdom . |
| 1603638 | 11/1981 | United Kingdom . |
| 2093463 | 9/1982 | United Kingdom . |
| 2151238 | 7/1985 | United Kingdom . |

OTHER PUBLICATIONS

Derwent Abstract of GB 2151238, (Ward), Jun. 1985.
J. Mech. Working Tech., 5, (1981), pp. 223-249 (Hope, Henderson, Parsons & Ward).
Polymer Bulletin, 5, (1981), pp. 317-324 (de Boer & Pennings).
Chem. Abs. 64 1506e.
Chem. Abs. 64 19819a.
Chem. Abs. 83 60626g.
Chem. Abs. 66 95721k.
Polymer J., 3, (1972), pp. 108-110.
A. Ciferri and I. M. Ward, Ultra-High Modulus Polymers, 1979, pp. 322, 323.
Journal of Polymer Science: Polymer Physics Edition, vol. 16, pp. 2083-2086 (1978).
J. de Boer et al., Polymer Bulletin, 5, 317-324 (1981).
M. A. Wilding et al., Plastics and Rubber Processing and Applications, vol. 1, No. 2, 1981.
D. L. M. Cansfield et al., Polymer Communications, vol. 24, 130-131, 1983.
P. S. Hope et al., Journal of Mechanical Working Technology, 5, pp. 223-249, 1981.
Juvet et al., C.A. 64, 1505/e, 1966.
Z. S. Egorova et al., C.A. 66, 95712k, 1967.
Z. S. Egorova et al., Radiostats. Khim, Moscow, 1964, pp. 288-290 (Pub. 1966).
S. S. Leshchenko et al., C.A. 64, 19819a, 1966.
S. S. Leshchenko et al., Dokl. Akad. Nauk SSSR, 167(2), 339-341 (1966) (Russ).
M. Hagiwara et al., C.A. 83, 60626g, 1975.
H. Mitsui et al., Polymer Journal, vol. 3, No. 1, 108-110 (1972).
T. Kaguja et al., Bull. Inst. Chem. Res., Kyoto Univ., vol. 55, No. 1, pp. 11-19, 1977.

*Primary Examiner*—Marion E. McCamish
*Assistant Examiner*—Arthur H. Koeckert
*Attorney, Agent, or Firm*—Finnegan, Henderson, Farabow, Garrett & Dunner

[57] ABSTRACT

A process for the preparation of an oriented homo- or co-polyalkene material of improved strain rate sensitivity, which process comprises subjecting the oriented homo- or co-polyalkene material having a weight average molecular weight ($\overline{M}_w$) $\leq$ 350,000, a number average molecular weight ($\overline{M}_n$) $\geq$ 5,000, and a 2% secant modulus of at least 10 GPa at a strain rate of $2 \times 10^{-5}$ sec$^{-1}$ to a high energy irradiation of a dosage of at least 1 Mrad and not more than 60 Mrads at an elevated temperature in vacuo or in an inert or sensitizing atmosphere.

17 Claims, No Drawings

POLYMER IRRADIATION

This application is a continuation of application Ser. No. 680,519, filed Dec. 10, 1984, now abandoned.

This invention relates to irradiated polymers; more particularly, this invention relates to irradiated polyalkenes of high tensile strength and to processes for their production.

In U.S. Pat. No. 4,228,118 there has been described a process for preparing a polyethylene fibre having a tenacity of at least 12 grams per denier, comprising:

(a) extruding a high density polyethylene having a $\overline{M}_n$ of at least 20,000 and a $\overline{M}_w$ of less than 125,000 through a heated spinneret having at least one orifice to provide at least one molten stream, wherein said heated spinneret is maintained at a temperature between 220° C. and about 335° C.;

(b) solidifying each said molten stream in a quenching zone to form a fibre;

(c) withdrawing said fibre from said quenching zone at a velocity of at least 30 meters per minute; and then (d) hot-drawing said fibre at a draw ratio of at least 20:1 while said fibre is in contact with a heated environment, wherein said heated environment is maintained at a temperature between 115° C. and 132° C., said temperatures, said velocity, and said draw ratio being correlated to provide fibre having a tenacity of at least 12 grams per denier, when measured at 72% relative humidity and 25° C. on a bundle of at least 8 filaments using a gauge length of at least 25 centimeters.

It has, however, been found that the tensile strength of the polyethylene fibres so produced is very sensitive to strain rate: thus, a fibre may exhibit a tensile strength of 1.2 GPa at 20° C. and at a strain rate of $10^{-1} \sec^{-1}$ while, at 20° C. and at a strain rate of $10^{-4} \sec^{-1}$, this may reduce to less than 0.4 GPa (Cansfield et al. Polymer Comm. 24, p. 130, (1983)), a 60% reduction in tensile strength. Polypropylene fibres may give a 20% reduction in tensile strength under comparable conditions. Associated with this very high strain rate sensitivity is an unacceptably high creep rate and inverse temperature dependence of tensile strength.

This invention seeks to provide homo- and copolymers of alkenes with reduced strain rate sensitivity, creep rate and temperature dependence.

According, therefore, to the present invention, there is provided a process for the preparation of an oriented homo- or co-polyalkene material of improved strain rate sensitivity, which process comprises subjecting the oriented homo- or co-polyalkene material having a weight average molecular weight $(\overline{M}_w) \leq 350,000$, desirably $\leq 200,000$ and preferably (particularly in the case of fibres) $\leq 150,000$, a number average molecular weight $(\overline{M}_n) \leq 5,000$, desirably $\leq 10,000$, and a 2% secant modulus of at least 10 GPa at a strain rate of $2 \times 10^{-5} \sec^{-1}$ to a high energy irradiation of a dosage of at least 1 Mrad, preferably of at least 5 Mrads, and not more than 60 Mrads at an elevated temperature in vacuo or in an inert or sensitising atmosphere.

It is preferred to utilise the present invention in relation to homo- or copolyethene material, especially homopolyethene material.

It had hitherto been found (de Boer et al. Polymer Bull. 5, p. 317, (1981) that irradiation at room temperature of oriented polyethene materials of high tensile strength causes a decrease in strength. Furthermore, it has also been found that irradiation at room temperature of oriented polyethene materials of very high modulus resulted, in the case of tube production, in product which failed at lower loads, while requiring higher energy input for a given plastic deformation, than that not irradiated (Hope et al. J. Mechanical Working Technology 5, p. 223 (1981)) and, in the case of fibres, in product with a substantial increase in creep rate (Wilding et al. Plastics and Rubber Processing and Applications 1, p. 167 (1981)). Surprisingly, it has now been found that, provided that the $\overline{M}_w$ of the oriented polyalkene material is below 350,000 (for example 200,000), preferably (particularly in the case of fibre) below 100,000, especially below 75,000, there is not only little reduction in high speed (above $10^{-4} \sec^{-1}$) tensile strength but also a marked increase in low speed (below $10^{-4} \sec^{-1}$) tensile strength together with an improvement in creep properties. Use of polyalkene materials of the aforesaid molecular weights also facilitates their fabrication and orientation.

Orientation of the polyalkene material may be effected by any of the processes disclosed in our UK Patents No. 1469526; 1480479; 1498628; 1506565; 1568964 or in our GB 2060469B. The oriented polyalkene material should have a 2% secant modulus of at least 10 GPa, preferably at least 20 GPa, at a strain rate of $2 \times 10^{-5} \sec^{-1}$. In the case of homopolyethene material it is particularly preferred that it should have a 2% secant modulus of at least 10 GPa, preferably at least 25 GPa, at a strain rate of $2 \times 10^{-5} \sec^{-1}$.

The high energy irradiation, which may be electron or γ-irradation, in accordance with the present invention may be effected in vacuo or in an inert atmosphere, such as argon. However, in accordance with a particularly preferred feature of this invention the high energy irradiation may be effected in a sensitising atmosphere. This may comprise a gaseous substance which is of sufficiently small molecular size to diffuse into the polyalkene and which, on irradiation, acts as a polyfunctional grafting moiety. Examples include substituted or unsubstituted polyunsaturated hydrocarbons; for example, acetylenic hydrocarbons such as acetylene; conjugated or unconjugated olefinic hydrocarbons such as butadiene and (meth)acrylate monomers; sulphur monochloride, with acetylene being particularly preferred. (By "gaseous" is meant herein that the sensitising atmosphere is in the gas phase, either above or below its critical temperature, at the irradiation temperature.)

Use of a sensitising atmosphere is found to increase the effectiveness for a given dose of irradiation so that a lower dose can be used to obtain a given increase in low speed tensile strength. Thus, in vacuo or inert atmosphere a dosage from 5 to 60, preferably from 15 to 40, Mrad is used whereas in a sensitising atmosphere a dosage from 1 to 40, preferably from 5 to 30 (for example from 10 to 20), Mrad may be used.

It is found essential to irradiate at elevated temperature. By "elevated temperature" is meant in temperature above ambient; for example, above 30° C. Provided that the polyalkene material is restrained from contracting, the favourable properties imparted by orientation may be preserved while the polyalkene material being irradiated is taken to progressively high temperatures, even up to a temperature where the material incipiently ceases to be selfsupporting. This may be above the temperature at which the material ceases to comprise crystallites. For example, the material may be irradiated and heated to a temperature from 30° C. to 140° C., preferably 40° C. to 130° C., especially from 60° C. to 120° C. Such oriented polyalkene materials have, on irradiation, an improved low speed tensile strength. There may, however, be occasions where it is advantageous to have a low irradiation temperature; this is feasible, although a subsequent annealing may be required.

It is also found that improved properties are obtained when the irradiated material is annealed, especially in a sensitising atmosphere; for example at a temperature from 30° C. to 140° C., preferably from 40° C. to 130° C., especially from 60° C. to 120° C.

This invention also provides an oriented homo- or co-polyalkene material, especially a homopolyethene fibre, of improved strain rate sensitivity whenever prepared by the aforesaid process.

This invention further provides an oriented homopolyethene material which has a 2% secant modulus of at least 10 GPa at a strain rate of $2 \times 10^{-5}$ sec$^{-1}$; a tensile strength of at least 0.4 GPa, preferably at least 0.5 GPa, at 20° C. and at a strain rate of $2 \times 10^{-5}$ sec$^{-1}$ and of at least 0.15 GPa, preferably at least 0.25 GPa, at 100° C. and at a strain rate of $8.3 \times 10^{-3}$ sec$^{-1}$; and a creep rate at 0.3 GPa initial stress of not more than $10^{-7}$ sec$^{-1}$, preferably not more than $10^{-9}$ sec$^{-1}$.

The following Examples illustrate the invention.

In each Example the oriented polyalkene material used was polyethene fibre produced by melt spinning ALATHON 7050 (ex Du Pont; $\overline{M}_w \sim 60.10^3$ and $\overline{M}_n \sim 22.10^3$) at 280° C. through a 19 hole spinneret at a winding speed of 150 meters per minute to give a 19 filament 855 denier yarn which was plied 10 times. This yarn was then hot drawn in accordance with the disclosure of UK Patent No. 1568964 to an effective draw ratio of 30×. In each Example approximately 15 meters of the oriented polyethene fibres were wound onto an aluminium spool through which cooling fluid could be passed. The spool was next inserted into an evacuatable glass tube and was irradiated by an electron beam produced by a Van de Graaff generator operating at 2.9 meV and 80 μA total current. A Co$^{60}$ source may also be used. Text procedures used were as follows:

(a) 2% secant modulus

For the room temperature tests, a 40 cm sample was mounted between flat plate grips lined with polyethylene sheet and mounted on an 'Instron Tensile Tester'. At other temperatures the sample was tested inside a cabinet in which case either a 10 cm or a 20 cm sample length was used. The length used for calculating strain rate was the free length of fibre between the two clamps. The 2% secant modulus is calculated by multiplying the stress at 2% elongation (using the unstrained cross sectional area) by 50 to obtain the theoretical stress (i.e. modulus) at 100 percent elongation.

(b) breaking strength

This is the same as tensile strength and is the stress at break (using the unstrained cross sectional area), again measured on an 'Instron Tensile Tester'.

(c) creep stress

The creep stress is the stress applied based on the unstrained cross sectional area. The creep strain rate is the limiting strain rate determined by a method described by Sherby O. D. and Dorn J. E., Anelastic creep of polymethyl methacrylate, J. Mech. Physics Solids 6 (1958) p. 145-62. The present measurements were made at room temperature by suspending a load from a 1 meter length of fibre and recording the creep until it reaches a constant value.

EXAMPLE 1

In this Example the glass tube was evacuated and the contained fibre, on irradiation, was permitted to assume autogenous temperature. Breaking strengths were measured at room temperature (23° C.) The results are given in Table 1.

TABLE 1

| | Irradiation | | | Breaking strength (GPa) - 1 Extension at break (%) - 2 2% secant modulus (GPa) - 3 | | | | | |
|---|---|---|---|---|---|---|---|---|---|
| | | Es- | | at a strain rate of | | | | | |
| | | timate | | 60%/min | | | .06%/min | | |
| Time | Temp | dose | Environ- | $10^{-2}$ sec$^{-1}$ | | | $10^{-5}$ sec$^{-1}$ | | |
| (min) | (°C.) | (Mrad) | ment | 1 | 2 | 3 | 1 | 2 | 3 |
| Nil | Nil | Nil | | .95 | 4 | 35 | .22* | 3* | 10 |
| 15 | 25-40 | 9 | vacuum | .94 | — | 34 | .22* | — | 11 |
| 30 | 25-55 | 17 | " | .90 | — | 34 | .30* | — | 15 |
| 60 | 25-75 | 35 | " | .84 | 3 | 32 | .43 | 6 | 16 |
| 90 | 25-90 | 52 | " | .88 | 3.5 | 31 | .56 | 4 | 18 |

*yield point

Table 1 indicates that increased doses of irradiation give small reductions in high speed strength but substantial increases in low speed strength.

EXAMPLE 2

In this Example the glass tube contained an acetylene atmosphere at standard pressure. Breaking strengths were measured at room temperature. Coolant water was passed through the spool to maintain the irradiation temperature as indicated. Samples 2 and 3 were annealed in acetylene prior to allowing access to air. The results are given in Table 2.

TABLE 2

| | Irradiation | | | Breaking strength (GPa) - 1 Extension at break (%) - 2 2% secant modulus (GPa) - 3 at a strain rate of | | | | | |
|---|---|---|---|---|---|---|---|---|---|
| | | Estimated | | 50%/min | | | .125%/min | | |
| Time | Temp | dose | | $8.3 \times 10^{-3}$ sec$^{-1}$ | | | $2.1 \times 10^{-5}$ sec$^{-1}$ | | |
| (min) | (°C.) | (Mrad) | Environment | 1 | 2 | 3 | 1 | 2 | 3 |
| 60 | 80 | 35 | vacuum | .83 | 3 | 32 | .49 | 6 | 17 |
| 18 | 23 | 20 | acetylene | .88 | 3 | 32 | .52 | 3.5 | 19 |
| 18 | 85 | 20 | acetylene | .94 | 3 | 35 | .62 | 3 | 24 |

Table 2 indicates that the use of an acetylene environment greatly reduces the required irradiation dose to achieve a given improvement in low speed strength; and that the effect varies as temperature.

EXAMPLE 3

In this Example the procedure of Example 2 was followed. The results are given in Table 3.

TABLE 3

| Irradiation | | | | Annealing | | Breaking strength (GPa) - 1 Extension at break (%) - 2 2% secant modulus (GPa) - 3 at a strain rate of | | | | | |
|---|---|---|---|---|---|---|---|---|---|---|---|
| | | | Irradiation | | | 50%/min | | | .125%/min | | |
| Time (min) | Estimated Temp (°C.) | dose (Mrad) | and annealing environment | time (min) | temp (°C.) | $8.3 \times 10^{-3} \sec^{-1}$ | | | $2.1 \times 10^{-5} \sec^{-1}$ | | |
| | | | | | | 1 | 2 | 3 | 1 | 2 | 3 |
| 18 | 25 | 20 | acetylene | not annealed | | .83 | 3 | 32 | .40* | 4* | 16 |
| 18 | 23 | 20 | acetylene | 30 | 86 | .88 | 3 | 32 | .52 | 3.5 | 19 |
| 18 | 85 | 20 | acetylene | 30 | 88 | .94 | 3 | 35 | .62 | 3 | 24 |

*yield point

Table 3 indicates that the low speed strength varies with both the temperature of irradiation and of annealing.

EXAMPLE 4

In this Example the procedure of Example 3 was followed. The results are given in Table 4.

TABLE 4

| Irradiation | | | Irradiation and annealing environment | Annealing | | Breaking strength (GPa) - 1 Extension at break (%) - 2 2% secant modulus (GPa) - 3 at a strain rate of | | | | | |
|---|---|---|---|---|---|---|---|---|---|---|---|
| | | | | | | 50%/min | | | .125%/min | | |
| Time (min) | Temp (°C.) | dose (Mrad) | | time (min) | temp (°C.) | $8.3 \times 10^{-3} \sec^{-1}$ | | | $2.1 \times 10^{-5} \sec^{-1}$ | | |
| | | | | | | 1 | 2 | 3 | 1 | 2 | 3 |
| 18 | 87 | 20 | acetylene | 30 | 88 | .94 | 3 | 35 | .62 | 3 | 24 |
| 18 | 81 | 40 | acetylene | 30 | 81 | .32 | 1 | — | .42 | 2 | 19 |

Table 4 indicates that high levels of irradiation cause major reductions in high speed strength indicating that molecular disruption has commenced.

EXAMPLE 5

In this Example the procedure of Example 1 was followed but the effect of irradiation on creep behaviour was also determined. The results are given in Table 5.

TABLE 5

| Irradiation | | | | Breaking strength (GPa) - 1 Extension at break (%) - 2 2% secant modulus (GPa) - 3 at a strain rate of | | | | | | |
|---|---|---|---|---|---|---|---|---|---|---|
| | | Estimated | | 50%/min | | | .125%/min | | | Creep rate |
| Time (min) | Temp (°C.) | dose (Mrad) | Environment | $8.3 \times 10^{-3} \sec^{-1}$ | | | $2.1 \times 10^{-5} \sec^{-1}$ | | | at 0.3 GPa |
| | | | | 1 | 2 | 3 | 1 | 2 | 3 | stress $\sec^{-1}$ |
| Nil | | Nil | | .91 | 4 | 34 | .25* | 3.5* | 11 | $1.3 \times 10^{-4}$ |
| 90 | 25-90 | 52 | vacuum | .83 | 3.5 | 34 | .58 | 0 | 19 | $3.10^{-9}$ |

*yield point

Table 5 indicates that the creep rate is dramatically reduced on irradiation.

EXAMPLE 6

The procedure of the previous Examples was followed but the breaking strengths were determined at the temperature indicated. The results are given in Table 6.

TABLE 6

| Irradiation dose (Mrad) | Irradiation environment | Breaking strength (GPa) - 1 Extension at break (%) - 2 2% secant modulus (GPa) - 3 at a strain rate of .5%/min ($8 \times 10^{-5} \sec^{-1}$) and testing temperature of | | | | | | | | | | | |
|---|---|---|---|---|---|---|---|---|---|---|---|---|---|
| | | 20° C. | | | 60° C. | | | 100° C. | | | 130° C. | | |
| | | 1 | 2 | 3 | 1 | 2 | 3 | 1 | 2 | 3 | 1 | 2 | 3 |
| Nil | | .36 | 5 | 12 | .12 | 5 | 6 | <.05 | 1 | — | melted | | |
| 20 | acetylene | .72 | 3 | 22 | .54 | 3 | 17 | .32 | 3 | 12 | .17 | 2 | 8* |
| 52 | vacuum | .66 | 4 | 18 | .48 | 6 | 13 | .28 | 5 | 9 | .14 | 5 | 2 |

*1% secant modulus
yield point

Table 6 indicates that there is a major improvement in the high temperature breaking strengths on irradiation.

This invention enables the production of high modulus, high strength homo- or co-polyalkene materials, especially polyethene fibres, having not only substantially reduced strain rate sensitivity of tensile strength and substantially reduced creep rate but also significantly enhanced high temperature tensile strength.

EXAMPLE 7

In this Example a 6 MeV (15 kW input, 800 watt beam) electron accelerator (ex Radiation Dyanamics Ltd., Swindon, England) was utilised.

Table 7 indicates that the higher power acceleration gives improved properties; in particular, there is a further improvement in low speed strength and high speed strength can now be higher than that of the control. A preferred dosage range from 20 to 30 Mrad is indicated.

TABLE 7

| Irradiation | | Estimated dose | Environment | Annealing | | Environment | Breaking strength (GPa) - 1 Extension at break (%) - 2 2% secant modulus (GPa) - 3 at a strain rate of | | | | | | | | |
|---|---|---|---|---|---|---|---|---|---|---|---|---|---|---|---|
| | | | | | | | 50%/min $8.3 \times 10^{-3} \sec^{-1}$ | | | 0.125%/min $2.1 \times 10^{-5}$ | | | 0.5%/min $8.3 \ 10^{-5} \sec^{-1}$ | | |
| Time (min) | Temp (°C.) | (Mrad) | (at 1 bar) | Time (min) | Temp (°C.) | (at 1 bar) | 1 | 2 | 3 | 1 | 2 | 3 | 1 | 2 | 3 |
| Nil | | Nil | | Nil | | | 0.98 | 5.2 | 32.4 | 0.24* | 3.8* | 10.6 | | | |
| Nil | | Nil | | Nil | | | 1.01 | 3.7 | 31.4 | | | | 0.35* | 4.6* | 1.24 |
| 24 | 90 | 20 | acetylene | 60 | 90 | acetylene | 1.15 | 4.3 | 31.3 | 0.73 | 5.1 | 16.5 | | | |
| 36 | 90 | 30 | acetylene | 60 | 90 | acetylene | 1.17 | 4.3 | 28.7 | 0.64 | 4.7 | 12.6 | | | |
| 12 | 90 | 10 | acetylene | 60 | 90 | acetylene | 0.81 | 2.9 | 29.9 | 0.40 | 4.4 | 13.2 | | | |
| 5 | 70 | 3.8 | acetylene | 70 | 90 | acetylene | 0.84 | 3.1 | 30.0 | 0.38 | 3.7 | 13.0 | | | |
| 5 | 70 | 3.8 | helium | 70 | 90 | acetylene | 0.89 | 4.0 | 30.6 | 0.24* | 4.5* | 9.7 | | | |
| 21 | 90 | 25 | acetylene | 50 | 90 | acetylene | 1.03 | 3.9 | 26.9 | | | | 0.76 | 4.2 | 16.4 |

*yield point
20 gm, rather than 0.2 gm, sample used.

EXAMPLE 8

The irradiation employed in this Example was from the 6 MeV accelerator.

Example runs 8.4 to 8.6 inclusive show that low doses can give modest improvements in properties, particularly at low strain rates.

Example run 8.10 suggests that improvements in properties at low strain rates can be obtained even at much higher weight average molecular weight.

TABLE 8

| Sample No. | Irradiation | | Estimated dose | Environment | Annealing | | Environment | Breaking strength (GPa) - 1 Extension at break (%) - 2 2% secant modulus (GPa) - 3 at a strain rate of | | | | | |
|---|---|---|---|---|---|---|---|---|---|---|---|---|---|
| | | | | | | | | 50%/min $8.3 \times 10^{-3} \sec^{-1}$ | | | 0.5%/min $8.3 \ 10^{-5} \sec^{-1}$ | | |
| | Time (min) | Temp (°C.) | (Mrad) | (at 1 bar) | Time (min) | Temp (°C.) | (at 1 bar) | 1 | 2 | 3 | 1 | 2 | 3 |
| 8.1 | Nil | | Nil | | Nil | | | 0.93* | 5.2* | 30.7 | 0.29* | 4.9* | 11.8 |
| 8.2 | Nil | | Nil | | Nil | | | 1.04 | 3.5 | 43.1 | | | |
| 8.3 | Nil | | Nil | | Nil | | | 0.92* | 5.0* | 31.6 | | | |
| 8.4 | 0.67 | 45 | 1.5 | acetylene | 30 | 90 | acetylene | 0.93* | 5.3* | 31.3 | 0.31* | 5.2* | 12.9 |
| 8.5 | 2 | 60 | 4.4 | acetylene | 30 | 90 | acetylene | 1.01* | 5.4* | 33.0 | 0.36* | 5.4* | 14.0 |
| 8.6 | 2 | 80 | 4.4 | acetylene | 30 | 90 | acetylene | 1.04 | 5.4 | 32.5 | 0.41* | 7.3* | 12.5 |
| 8.7 | 17 | 120 | 37 | acetylene | 90 | 93 | acetylene | 1.13 | 3.3 | 37.6 | 0.84 | 3.6 | 24.6 |
| 8.8 | 17 | 110 | 37 | acetylene | 30 | 95 | acetylene | 0.16 | 4.1 | 28.2 | 0.74 | 4.6 | 16.1 |
| 8.9 | Nil | | Nil | | Nil | | | 1.01 | 3.7 | 29.4 | 0.61* | 5.2* | 19.7 |
| 8.10 | 17 | 110 | 37 | acetylene | 30 | 95 | acetylene | 0.87 | 3.2 | 29.2 | 0.70 | 5.6 | 16.2 |

*yield point
Alathon 7050 polymer (190 filament) $\overline{M}_w\ 60 \times 10^{-3}$
Unifoss 2912 polymer (monofil) $\overline{M}_w\ 220 \times 10^{-3}$

EXAMPLE 9

The results of this Example, shown in Table 9, show that irradition at 6 MeV of Alathon 7050 fibres increases both high and low speed annealing strengths. It is also noteworthy that the treatment resists, and may reverse, the rapid decline in tangential modulus which occurs with increasing strain at all test rates on untreated fibres.

TABLE 9

| Sample No. | Irradiation | | Estimated dose | Environment | Annealing | | Environment | Breaking strength (GPa) - 1 Extension at break (%) - 2 Tanngential modulus (GPa) at 3.1 0.25% 3.1 1% 3.3 2% at a strain rate of | | | | | | | | | |
|---|---|---|---|---|---|---|---|---|---|---|---|---|---|---|---|---|---|
| | | | | | | | | 50% min $8.3 \times 10^{-3} \sec^{-1}$ | | | | | 0.125% min $2.1 \times 10^{-5} \sec^{-1}$ | | | | |
| | Time (min) | Temp (°C.) | (Mrad) | (at 1 bar) | Time (min) | Temp (°C.) | (at 1 bar) | 1 | 2 | 3.1 | 3.2 | 3.3 | 1 | 2 | 3.1 | 3.2 | 3.3 |
| 9.1 | Nil | | Nil | | Nil | | | 0.93 | 5.0 | 42.3 | 28.6 | 22.0 | 0.29* | 4.9* | 28.8 | 9.4 | 5.0 |
| 9.2 | 17 | 110 | 25 | acetylene | 30 | 95 | acetylene | 1.06 | 4.1 | 43.5 | 24.9 | 24.9 | 0.74 | 4.6 | 19.2 | 14.1 | 16.7 |

In conclusion, in accordance with preferred aspects of the present invention, it is found that the creep strain of the irradiated homopolyethene material of this invention, at 0.3 GPa initial stress, plateaus at typically less than 2% and remains substantially constant for more and $10^5$ sec., usually for more than $10^6$ secs., from applying the initial stress. It is also found that, with irradiation at 6 MeV, the breaking strength, both at high and low speed testing, of the irradiated homopolyethene material of this invention is not less, and is preferably higher, than that of the untreated fibre. It is further found that the tangential modulus of the irradiated homopolyethene material of this invention at 2% strain is not less, and is preferably higher, than that at 1% strain.

What is claimed is:

1. A process for the preparation of an oriented homo-polyethylene or co-polyethylene of improved strain rate sensitivity, which process comprises:
   (1) Providing the solid homo- or copolyethylene;
   (2) Orienting the molecules of said homo- or co-polyethylene to produce a highly oriented product having a 2% secant modulus of at least 10 GPa at a strain rate of $2 \times 10^{-5}$ sec$^{-1}$;
   (3) Subjecting the oriented product to a high energy irradiation of a dosage of at least 1 Mrad and not more than 60 Mrads at a temperature of from 30° C. to 140° C. in vacuo or in an inert or sensitizing atmosphere, wherein said homo- or co-polyethylene has a weight average molecular weight ($\overline{M}_w$) less than or equal to 350,000, a number average molecular weight of ($\overline{M}_n$) greater than or equal to 5,000.

2. A process according to claim 1 wherein the oriented polyalkene material comprises a homopolyethene material.

3. A process according to claim 2 wherein the oriented polyalkene material has a 2%% secant modulus of at least 20 GPa at a strain rate of $2 \times 10^{-2}$ sec$^{-1}$.

4. A process according to claim 1 wherein the oriented polyalkene material has an $\overline{M}_w \leq 100,000$.

5. A process according to claim 1 wherein the high energy irradiation is effected in vacuo or under an argon atmosphere.

6. A process according to claim 5 wherein the high energy irradiation is of a dosage from 15 Mrads to 50 Mrads.

7. A process according to claim 1 wherein the high energy irradiation is effected in a sensitising atmosphere.

8. A process according to claim 7 wherein the sensitising atmosphere comprises a gaseous polyunsaturated hydrocarbon.

9. A process according to claim 7 wherein the sensitising atmosphere comprises acetylene.

10. A process according to claim 1 wherein the high energy irradiation is of a dosage from 10 Mrads to 40 Mrads.

11. A process according to claim 1 wherein the irradiation temperature is from 30° C. to 120° C.

12. A process according to claim 1 wherein the irradiated material is annealed in a sensitising atmosphere.

13. A process according to claim 12 wherein the annealing temperature is from 40° C. to 120° C.

14. A process according to claim 1, wherein the sensitizing atmosphere comprises a gaseous polyunsaturated hydrocarbon.

15. A process according to claim 1, wherein the sensitizing atmosphere is selected from acetylene, conjugated or unconjugated olefinic hydrocarbons, acrylate monomers or sulfur monochloride.

16. A process according to claim 1, wherein the sensitizing atmosphere is an atmosphere which acts as a polyfunctional grafting moiety.

17. A process for the preparation of an oriented homo-polyethylene or co-polyethylene of improved strain rate sensitivity, which process comprises:
   (1) Melt spinning the homo- or co-polyethylene to provide melt spun fibers of filaments;
   (2) Orienting the molecules of said homo- or co-polyethylene to produce fiber or filaments having a 2% secant modulus of at least 10 GPa at a strain rate of $2 \times 10^{-5}$ sec$^{-1}$;
   (3) Subjecting the oriented fiber or filament to a high energy irradiation of a dosage of at least 1 Mrad and not more than 60 Mrads at a temperature of from 30° C. to 140° C. in vacuo or in an inert or sensitizing atmosphere, wherein said homo- or co-polyethylene has a weight average molecular weight ($\overline{M}_w$) less than or equal to 350,000, a number average molecular weight of ($\overline{M}_n$) greater than or equal to 5,000.

* * * * *

UNITED STATES PATENT AND TRADEMARK OFFICE
CERTIFICATE OF CORRECTION

PATENT NO. : 5,160,464

DATED : November 3, 1992

INVENTOR(S) : Ward et al.

It is certified that error appears in the above-identified patent and that said Letters Patent is hereby corrected as shown below:

On the title page: Item [54] and Column 1, line 1, change "POLYMER IRRADIATION" to --PROCESS OF TREATING POLYETHLYENE BY ORIENTING AND IRRADIATING--.

Claim 3, column 9, line 37, delete "%", second occurrence;

Claim 15, column 10, line 23, change "acrylate" to --(meth)acrylate--.

Signed and Sealed this

Sixteenth Day of November, 1993

Attest:

BRUCE LEHMAN

Attesting Officer

Commissioner of Patents and Trademarks